United States Patent [19]

Heinz et al.

[11] Patent Number: 5,122,587
[45] Date of Patent: Jun. 16, 1992

[54] TWO STAGE PROCESS OF PREPARING POLYARYLETHERKETONES

[75] Inventors: Gerhard Heinz, Weisenheim; Robert R. Lieder, Limburgerhof, both of Fed. Rep. of Germany

[73] Assignee: BASF Aktiengesellschaft, Ludwigshafen, Fed. Rep. of Germany

[21] Appl. No.: 392,301

[22] Filed: Aug. 11, 1989

[30] Foreign Application Priority Data

Aug. 30, 1988 [DE] Fed. Rep. of Germany ....... 3829283

[51] Int. Cl.$^5$ .................. C08G 8/02; C08G 14/00; C08G 65/40
[52] U.S. Cl. .................... 528/126; 528/125; 528/128; 528/174; 528/219; 525/471; 525/534
[58] Field of Search ............... 528/125, 126, 128, 174, 528/219; 525/534, 471

[56] References Cited

U.S. PATENT DOCUMENTS

| 4,108,837 | 8/1978 | Johnson et al. | 528/126 |
| 4,175,175 | 11/1979 | Johnson et al. | 528/125 |
| 4,307,222 | 12/1981 | Schwab et al. | 528/126 |
| 4,320,224 | 3/1982 | Rose et al. | 528/125 |
| 4,751,274 | 6/1988 | Ittemann et al. | 525/534 |

FOREIGN PATENT DOCUMENTS 0001879 5/1979 European Pat. Off.

OTHER PUBLICATIONS

"VIII. Drift of Copolymers Composition With Increasing Conversion", Alfrey et al., Copolymerization, Interscience Publishers, New York, 1952, pp. 147-156.

Primary Examiner—John Kight, III
Assistant Examiner—P. Hampton-Hightower
Attorney, Agent, or Firm—Oblon, Spivak, McClelland, Maier & Neustadt

[57] ABSTRACT

High molecular weight polyaryletherketones are prepared by nucleophilic polycondensation of a bisphenol with a mixture of a difluoroaromatic and a dichloroaromatic by a process in which, in a first stage, the total amount of bisphenol and dichloroaromatic is added and, in a second stage, the difluoroaromatic is added. The resulting polyaryletherketones have a reduced viscosity of not less than 0.65 and contain from 0.003 to 0.03% by weight of organically bonded chlorine and from 0.003 to 0.03% by weight of organically bonded fluorine.

3 Claims, No Drawings

TWO STAGE PROCESS OF PREPARING POLYARYLETHERKETONES

The present invention relates to a process for the preparation of polyaryletherketones by nucleophilic polycondensation of a bisphenol with a mixture of a dichloroaromatic compound and a difluoroaromatic compound.

Nucleophilic polycondensation of bisphenols with dihaloaromatics for the preparation of polyaryletherketones has long been known, for example from DE-B1 545 106 and EP-B-1 879. It is also known that high molecular weight polyaryletherketones are obtained only when the relatively expensive difluoro compounds are used as dihaloaromatics. In EP-B-1 879, at the top of page 5, it is stated that, for cost reasons, some of the difluoro compound can be replaced by the dichloro compound. However, we have found that the resulting polymers have a molecular weight which is too low for many intended uses. For the preparation of films, fibers and moldings, the reduced viscosity $\eta$ (measured in 0.5% strength solution in concentrated sulfuric acid at 25° C.) of the polyaryletherketone must be not less than 0.70, in particular 0.75.

It is an object of the present invention to provide a process for the preparation of high molecular weight polyaryletherketones, in which some of the expensive difluoro compounds are replaced by the cheaper dichloro compounds.

We have found that this object is achieved if, in a two-stage process, the total amount of the bisphenol and of the dichloro compound is reacted in the first stage, and the difluoro compound is not added until the second stage.

The present invention accordingly relates to a process for the preparation of high molecular weight polyaryletherketones by polycondensation of a bisphenol A with a dihaloaromatic compound B in a molar ratio A : B of from 0.9 : 1 to 1.1 : 1 at from 200° to 400° C. in a polar, aprotic solvent in the presence of an alkali metal carbonate, a mixture of B1 from 1 to 30% by weight of a dichloro compound and B2 from 99 to 70% by weight of a difluoro compound being used as the dihaloaromatic B, wherein 1. in a first stage, virtually the total amount of dichloro compound B1 and, if required, not more than half the difluoro compound B2 are reacted and
2. in a second stage, the remainder of the difluoro compound B2 is added.

The polyaryletherketones are preferably those of the general formula

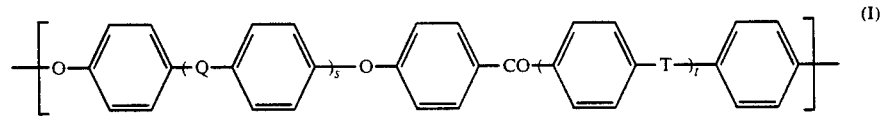

where s and t are each 0, 1, 2 or 3 and Q and T are each —O— or —CO—.

The polyaryletherketones of the formula I which are obtained in the novel process have a reduced viscosity of not less than 0.65 and contain from 0.003 to 0.03, preferably from 0.005 to 0.02, % by weight of organically bonded chlorine and from 0.003 to 0.03, preferably from 0.005 to 0.02, % by weight of organically bonded fluorine.

The contents of organically bonded chlorine and fluorine are determined as follows:

The total fluorine or chlorine content is obtained by Wickbold combustion in the oxyhydrogen flame followed by determination of fluorine by ion-sensitive end determination and of chlorine by ion chromatography.

The content of ionically bonded fluorine or chlorine is determined in an aqueous extract, fluorine being determined by ion-sensitive end determination and chlorine being determined potentiometrically with silver nitrate. The content of organically bonded fluorine or chlorine is then obtained from the difference between the total fluorine or chlorine content and the ionically bonded fluorine or chlorine.

Examples of suitable bisphenols a are:

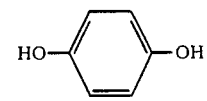

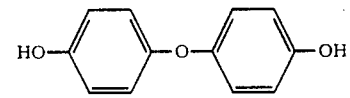

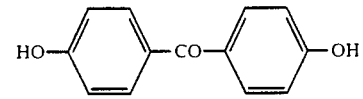

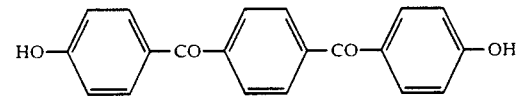

Examples of suitable dihaloaromatics B are:

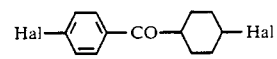

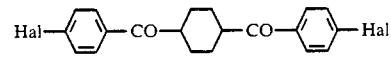

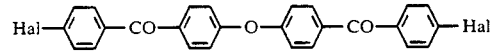

The abovementioned monomers are only a selection of the monomers which may be used in the nucleophilic preparation. If necessary, further monomers which contains diphenylene, napghtylene, —S—, —SO₂—or imide bridge members may also be present, in amounts of not more than 20 mol %.

The weight average molecular weight of the novel polyaryletherketones is in general from 10,000 to 150,000, preferably from 15,000 to 100,000, in particular from 18,000 to 80,000.

According to the invention, mixtures of B1 from 1 to 30% by weight of a dichloro compound and B2 from 99 to 70% by weight of a difluoro compound are used as dihaloaromatics B. The mixture preferably contains from 2 to 20, in particular from 5 to 15, % by weight of the dichloro compound.

In the first stage, virtually the total amount of bisphenol A and of dichloro compound and, if required, not more than half, preferably less than one quarter, of the difluoro compound are reacted. In practice, this means that no more than 2%, preferably less than 1%, of the corresponding dichloro compounds can also be added in the second stage.

The novel nucleophilic polycondensation is described in detail in EP-B-1 879. It is carried out in a polar, aprotic solvent, preferably in a solvent containing sulfone groups. Diphenyl sulfone is particularly preferred. The amount of diphenyl sulfone is in general from 5 to 100, preferably from 5 to 20, moles per mole of monomer. This gives a preferred solids content of the reaction solution of from 5 to 50, particularly preferably from 10 to 40, % by weight.

The polycondensation is carried out in the presence of an alkali metal carbonate. Potassium carbonate and mixtures of potassium carbonate and sodium carbonate are preferred. Not less than 2 moles of alkali metal carbonate should be used per mole of bisphenol.

We have found that high molecular weight polyetherketones are formed particularly when the temperature in the first stage of the polycondensation is not more than 300° C., preferably not more than 275° C., in particular not more than 250° C. The optimum temperatures are from 230° to 240° C. for the first stage and from 300° to 320° C. for the second stage.

The reaction in the first stage should advantageously take not less than 0.5, preferably not less than 1, hour. The optimum reaction times are from 1 to 2 hours in the first stage and from 1 to 3 hours in the second stage.

The water formed during the polycondensation can be removed with the aid of an azeotrope former, by reducing the pressure or, preferably, by passing in a stream of nitrogen and distilling off the water. Suitable azeotrope formers are all compounds which boil in the region of the reaction temperature under atmospheric pressure and can be mixed homogeneously with the reaction mixture without undergoing chemical reactions.

After the polycondensation, free phenolate terminal groups can be reacted with an arylating or alkylating agent, such as methylene chloride (or 4-fluorobenzophenone) for stabilization. This is preferably effected at not more than 350° C., the lower temperature limit being determined by the solubility of the polyaryletherketone in the solvent used.

The reaction products can be worked up by conventional methods. Advantageously, a finely divided material is produced from the melt and is freed from reaction solvent (eg. diphenyl sulfone) by extraction with a suitable solvent (eg. acetone). Residues of alkali metal carbonates and alkali metal fluorides can then be removed by extraction with water.

The novel polyaryletherketones can be mixed with other polyaryletherketones or with polyarylethersulfones.

Fillers, pigments and conventional processing assistants can also be added. Examples of reinforcing fillers are carbon fibers and, preferably, glass fibers, the latter being used, for example, in the form of glass fabrics, glass mats, surfacing mats and, preferably, glass rovings or chopped glass filaments.

The novel polyaryletherketones have high heat distortion resistance and good processibility in combination with sufficiently high toughness and strength. Because of these properties, they can advantageously be processed to give films, fibers and injection molded articles, in particular electrical and electronic components.

In the Examples, parts and percentages are by weight.

EXAMPLE 1

19.075 g of 1,4-bis-(p-chlorobenzoyl)-benzene (BCBB), 19.93 g of hydroquinone and 27.4 g of potassium carbonate were added to 600 g of diphenyl sulfone at 200 C. After the mixture had been stirred for 1.5 hours under nitrogen at an internal temperature of 230° C., the temperature was brought to 200° C. and 40.531 g of 1,4-bis-(p-fluorobenzoyl)-benzene (BFBB) and 0.072 g of 4-fluorobenzophenone were added. At the end of the subsequent temperature program (1 h at 200° C., 1 h at 240° C., 1 h at 300° C. and 1 h at 320° C.), the mixture was worked up by extraction with acetone and water.

EXAMPLE 2

As for Example 1, but with 6.359 g of BCBB and 52.11 g of BFBB.

EXAMPLE 3

As for Example 1, but with 3.18 g of BCBB and 55.01 g of BFBB.

EXAMPLE 4 (Comparison)

As for Example 1, but with 63.58 g of BCBB as the sole dihalo component.

EXAMPLE 5 (Comparison)

As for Example 1, except that all components were added simultaneously.

EXAMPLE 6 (Comparison)

As for Example 2, except that all components were added simultaneously.

Results:

| Example | Moles of BFBB | Moles of BCBB | Moles of hydroquinone | % org. fluorine | % org. chlorine | $\eta_{red}$ |
|---|---|---|---|---|---|---|
| 1 | 0.7 | 0.3 | 1 | 0.01 | 0.029 | 0.68 |
| 2 | 0.9 | 0.1 | 1 | 0.01 | 0.01 | 0.72 |
| 3 | 0.95 | 0.05 | 1 | <0.01 | 0.007 | 0.83 |
| 4 | 0 | 1 | 1 | — | 0.12 | 0.32 |
| 5 | 0.7 | 0.3 | 1 | <0.05 | 0.08 | 0.4 |
| 6 | 0.9 | 0.1 | 1 | <0.05 | 0.04 | 0.52 |

We claim:

1. A two-stage process for the preparation of a high molecular weight polyaryletherketone consisting essentially of condensing a bisphenol component A with a dihaloaromatic component B in a molar ratio A:B of from 0.9:1 to 1.1:1 at from 200° to 400° C. in a polar, aprotic solvent in the presence of an alkali metal carbonate, said component B consisting essentially of a mixture of B1) from 1 to 30% by weight of an aromatic dichloro compound and B2) from 99 to 70% by weight of an aromatic difluoro compound where in a first stage, virtually the total amount of dichloro compound B1 and, if required, not more than half the difluoro compound B2 are reacted and, in a second stage, the remainder of the difluoro compound B2 is added.

2. A process as claimed in claim 1, wherein the reaction in the first stage takes not less than 0.5 hour.

3. A process as claimed in claim 1, wherein the temperature in the first stage is not more than 300° C.

* * * * *